(12) United States Patent
Nakata et al.

(10) Patent No.: US 6,648,705 B2
(45) Date of Patent: Nov. 18, 2003

(54) SHAFT COUPLING FOR OUTBOARD MOTOR

(75) Inventors: Jun Nakata, Shizuoka (JP); Yasuhiko Shibata, Shizuoka (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/860,269

(22) Filed: May 18, 2001

(65) Prior Publication Data

US 2001/0046818 A1 Nov. 29, 2001

(30) Foreign Application Priority Data

May 18, 2000 (JP) .................................. 2000-145986

(51) Int. Cl.[7] .......................... B63H 23/34; F01M 1/00
(52) U.S. Cl. .................................... 440/83; 123/196 W
(58) Field of Search .................. 440/83, 88, 88 R, 440/88 L; 123/196 W; 277/434, 581

(56) References Cited

U.S. PATENT DOCUMENTS

| | | | | | |
|---|---|---|---|---|---|
| 2,684,061 A | * | 7/1954 | Kiekhaefer | ............ | 123/196 W |
| 4,452,194 A | * | 6/1984 | Watanabe | .............. | 123/196 W |
| 4,588,385 A | * | 5/1986 | Suzuki et al. | ................. | 440/88 |
| 4,790,781 A | | 12/1988 | Takahashi | | |
| 4,802,871 A | * | 2/1989 | Watanabe et al. | ............. | 440/88 |
| 4,904,214 A | * | 2/1990 | Eick | ........................... | 440/83 |
| 5,074,812 A | | 12/1991 | Watanabe | | |
| 5,180,297 A | * | 1/1993 | Hansen et al. | .............. | 418/104 |
| 5,366,399 A | * | 11/1994 | Reid et al. | ..................... | 440/83 |
| 5,372,526 A | | 12/1994 | Ozawa et al. | | |
| 5,524,581 A | * | 6/1996 | Rush et al. | ............ | 123/196 W |
| 5,558,456 A | | 9/1996 | Nakase et al. | | |
| 5,653,448 A | * | 8/1997 | Schlosser | .................... | 277/565 |
| 5,778,848 A | * | 7/1998 | Takahashi et al. | ..... | 123/196 W |
| 5,876,188 A | | 3/1999 | Okamoto | | |
| 6,067,951 A | * | 5/2000 | Kitajima | ................ | 123/196 W |
| 6,192,853 B1 | * | 2/2001 | Natsume | ................ | 123/196 W |

FOREIGN PATENT DOCUMENTS

JP  4-295114  10/1992

OTHER PUBLICATIONS

Co-pending patent application: Ser. No. 09/688,511, filed Oct. 16, 2000, entitled Engine Throttle Valve Linkage, in the names of Atsushi Isogawa, Yukinori Kashima, and assigned to Sanshin Kogyo Kabushiki Kaisha.

Co-pending patent application: Ser. No. 09/664,513, filed Sep. 18, 2000, entitled Lubrication System for Outbound Motor Engine, in the name of Toshihiro Nozue, and assigned to Sanshin Kogyo Kabushiki Kaisha.

* cited by examiner

Primary Examiner—S. Joseph Morano
Assistant Examiner—Andrew Wright
(74) Attorney, Agent, or Firm—Knobbe, Martens, Olson & Bear LLP.

(57) ABSTRACT

A shaft coupling for an outboard motor includes an improved construction that can be held under a good lubricative condition. The outboard motor includes an engine. An engine body defines a first aperture through which a crankshaft extends and is journaled. A recessed portion of the crankshaft defines inner spline grooves. A support member that supports the engine body has a second aperture. A driveshaft extends through the second aperture toward the recessed portion. The driveshaft has a tip portion defining outer spline grooves that are coupled with the inner spline grooves. A first seal member is disposed between an outer surface of the output shaft and an inner surface of the first aperture. A second seal member is disposed between an outer surface of the driveshaft and an inner surface the second aperture. The engine body, the support member, the output shaft, the driveshaft and the first and second seal members together define a lubricant chamber to enclose lubricant.

23 Claims, 5 Drawing Sheets

SHAFT COUPLING FOR OUTBOARD MOTOR

PRIORITY INFORMATION

This application is based on and claims priority to Japanese Patent Application No. 2000-145986, filed May 18, 2000, the entire contents of which are hereby expressly incorporated by reference.

BACKGROUND OF THE INVENTION

1. Field of the Invention

This invention generally relates to a shaft coupling for an outboard motor, and more particularly relates to an improved shaft coupling for an outboard motor that has a lubricant chamber around shafts of the coupling.

2. Description of Related Art

An outboard motor typically comprises a power head including an internal combustion engine and a housing unit that depends from the power head. Some outboard motors also have an intermediate member positioned between the power head and the housing unit to support the engine above the housing unit. The engine generally includes a vertically-extending crankshaft that passes through an aperture defined at a bottom end of the engine body. The housing unit that depends from the power head generally encloses a vertically-extending driveshaft, which drives a submerged marine propulsion device.

The crankshaft typically comprises a lower recessed portion that receives an upper portion of the driveshaft such that the two shafts can be coupled together. The shaft coupling typically is made as such that the recessed portion of the crankshaft comprises inner spline grooves and the upper portion of the driveshaft comprises outer spline grooves that engage with the inner spline grooves of the crankshaft. The driveshaft, thus, is rotatably coupled to the crankshaft and can be driven by the crankshaft through the shaft coupling when the engine operates. The intermediate member, because of this coupling configuration, also defines an aperture through which the driveshaft extends downward from the crankshaft.

Usually, grease lubricates the shaft coupling. In order to enclose the grease around the coupling, the engine body and the intermediate member are coupled together in a fluid-tight manner. In addition, to reduce the amount of grease leaking out through the aperture of the intermediate member, seal members generally are disposed between an inner surface of the recessed portion and an outer surface of crankshaft and between an inner surface of the aperture of the intermediate member and an outer surface of the driveshaft housing.

Even with such a sealing arrangement, the grease is lost over time. The loss of grease generally occurs because the sealing arrangement is not perfect and the grease slowly works its way out of the chamber created among the seals due to the rotational movement of the driveshaft and the crankshaft. As the grease escapes, the coupling begins to prematurely wear at or around the spline connection. The wear produces metal dust, flakes and shavings in the coupling region. The metal dust, flakes and shaving can gall the coupling such that the driveshaft and the crankshaft become difficult to separate during maintenance. Furthermore, water also can work into the chamber in which the coupling is positioned after some of the grease has escaped. The water can rust or corrode the shafts over time and can work to displace further grease.

One appropriate way to resolve this problem is to disassemble the coupling and to repack grease around the coupling. This method, however, is quite troublesome and time consuming. Under the circumstances, users of the outboard motors dislike disassembling the shaft coupling and the shaft coupling is likely to be improperly maintained. A need therefore exists for an improved outboard motor shaft coupling that can maintain its state of lubrication.

SUMMARY OF THE INVENTION

In accordance with one aspect of the present invention, an outboard motor comprises an internal combustion engine. The engine includes an engine body and an output shaft. The engine body defines a first aperture through which the output shaft extends and is journaled. The output shaft has a recessed portion. The recessed portion defines inner spline grooves. A support member supports the engine body. The support member defines a second aperture. A driveshaft extends through the second aperture toward the recessed portion. The driveshaft has a tip portion defining outer spline grooves. The outer spline grooves are coupled with the inner spline grooves so that the driveshaft is connected to the output shaft for rotation together with the output shaft. A first seal member is disposed between an outer surface of the output shaft and an inner surface of the first aperture. A second seal member is disposed between an outer surface of the driveshaft and an inner surface the second aperture. The engine body, the support member, the output shaft, the driveshaft and the first and second seal members together define a lubricant chamber to enclose lubricant.

In accordance with another aspect of the present invention, an outboard motor comprises an internal combustion engine. The engine includes an engine body and an output shaft. The engine body defines a first aperture through which the output shaft extends and is journaled. The output shaft has a recessed portion. The recessed portion defines inner spline grooves. An exhaust system is arranged to discharge exhaust gases from the engine. An exhaust guide member defines a portion of the exhaust system and supports the engine body. The exhaust guide member defines a second aperture. A driveshaft extends through the second aperture toward the recessed portion. The driveshaft has a tip portion defines outer spline grooves. The outer spline grooves are coupled with the inner spline grooves so that the driveshaft is connected to the output shaft for rotation together with the output shaft, and means are provided for trapping lubricant at least around the inner and outer spline grooves.

In accordance with a further aspect of the present invention, a shaft coupling is provided for an internal combustion engine. The shaft coupling comprises an engine body. An output shaft extends through an aperture defined in the engine body. A coupling member is adapted to couple the engine body to a housing of the driven shaft. The coupling member is fluid-tightly affixed to the engine body. A driven shaft extends through a through-hole defined in the coupling member to be coupled with the output shaft. A first seal is arranged to seal between the engine body and the output shaft. A second seal is arranged to seal between the coupling member and the driven shaft. The second seal has a base portion and a pair of seal portions bifurcated from the base portion. The seal portions abut on the outer surface of the driven shaft. The engine body, the output shaft, the coupling member, the driven shaft and the first and second seals together define a lubricant chamber.

BRIEF DESCRIPTION OF THE DRAWINGS

These and other features, aspects and advantages of the present invention will now be described with reference to the drawings of preferred embodiments which are intended to illustrate and not to limit the invention. The drawings comprise 6 figures.

DETAILED DESCRIPTION OF THE PREFERRED EMBODIMENTS OF THE INVENTION

Figure 1:
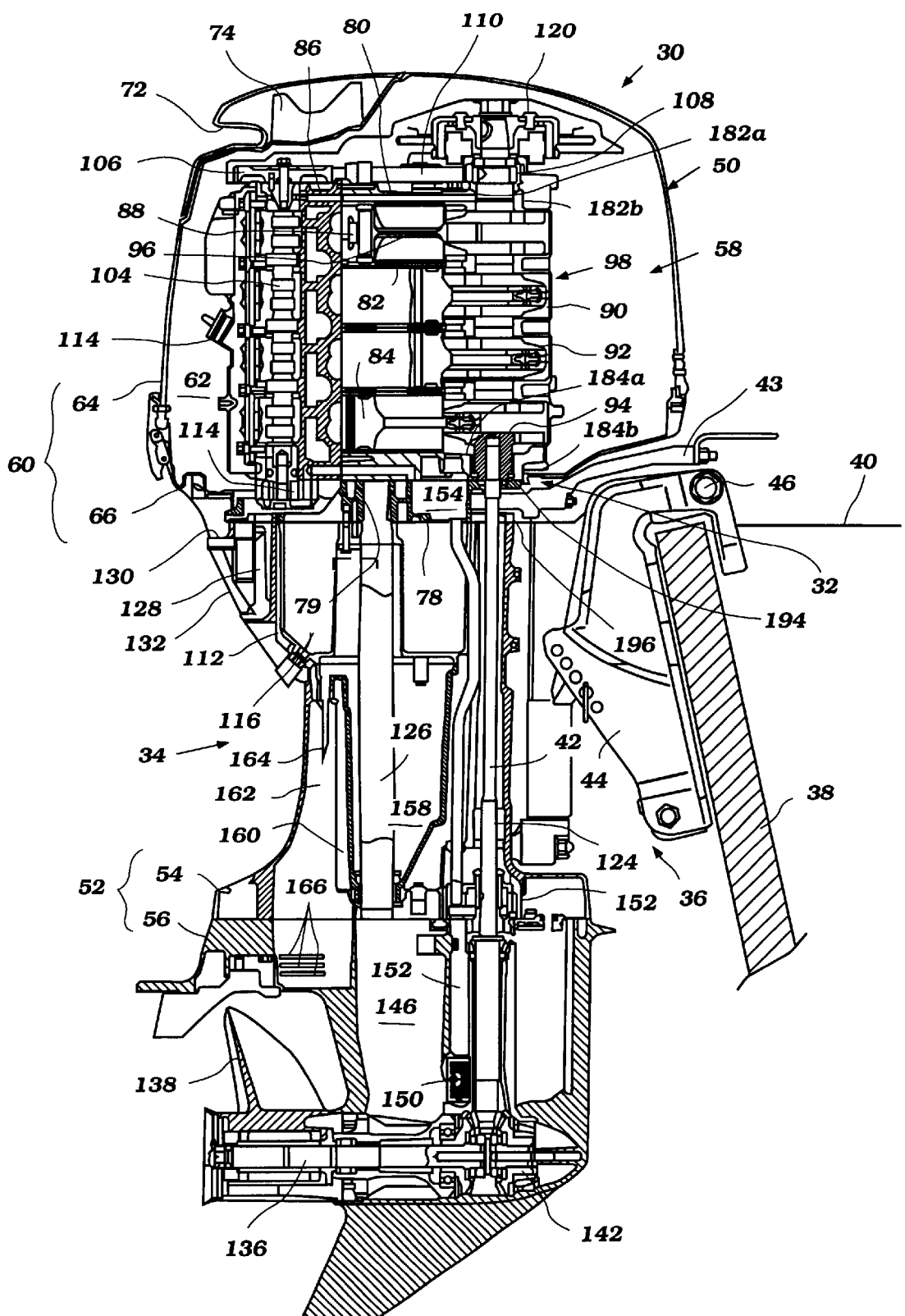
FIG. 1 is a side elevation cross-sectioned view of an outboard motor configured in accordance with a preferred embodiment of the present invention.

With reference to FIG. 1, an overall construction of an outboard motor 30, which employs a preferred shaft coupling 32 arranged in accordance with certain features, aspects and advantages of the present invention, will be described.

In the illustrated arrangement, the outboard motor 30 comprises a drive unit 34 and a bracket assembly 36. The bracket assembly 36 supports the drive unit 34 on a transom 38 of an associated watercraft 40 and places a marine propulsion device in a submerged position when the watercraft 40 is resting on the surface of a body of water with the outboard motor in an operative position. The bracket assembly 36 preferably comprises a swivel bracket 42, a clamping bracket 44, a steering shaft and a pivot pin 46.

The steering shaft typically extends through the swivel bracket 42 and is affixed to the drive unit 34. The steering shaft is pivotally journaled for steering movement about a generally vertically extending steering axis defined within the swivel bracket 42. A steering handle 43 extends forwardly from the steering shaft so that the operator can steer the drive unit 34. The clamping bracket 44 comprises a pair of bracket arms that are spaced apart from each other and that are affixed to the watercraft transom 38. The pivot pin 46 completes a hinge coupling between the swivel bracket 42 and the clamping bracket 44. The pivot pin 46 extends through the bracket arms so that the clamping bracket 44 supports the swivel bracket 42 for pivotal movement about a generally horizontally extending tilt axis defined by the pivot pin 46. The drive unit 34 thus can be tilted or trimmed about the pivot pin 46.

As used through this description, the terms "forward," "forwardly" and "front" mean at or to the side where the bracket assembly 36 is located, and the terms "rear," "reverse," "backwardly" and "rearwardly" mean at or to the opposite side of the front side, unless indicated otherwise or otherwise readily apparent from the context use.

A hydraulic tilt and trim adjustment system preferably is provided between the swivel bracket 42 and the clamping bracket 44 to tilt (raise or lower) the swivel bracket 42 and the drive unit 34 relative to the clamping bracket 44. Otherwise, the outboard motor 30 can have a manually operated system for tilting the drive unit 34.

The illustrated drive unit 34 comprises a power head 50 and a housing unit 52 which includes a driveshaft housing 54 and a lower unit 56. The power head 50 is disposed atop the drive unit 34. The power head 50 contains an internal combustion engine 58 that is positioned within a protective cowling 60. Preferably, the protective cowling 60 defines a generally closed cavity 62 in which the engine 58 is disposed. The protective cowling 60 preferably comprises a top cowling member 64 and a bottom cowling member 66. The top cowling member 64 is preferably detachably affixed to the bottom cowling 66 so that a user, operator, mechanic or repair person can access the engine 58 for maintenance or for other purposes.

The top cowling 64 preferably has at least one air intake opening 72 and at least one air duct 74 disposed on its rear and top portion. Ambient air is drawn into the closed cavity 62 through the opening 72 and then through the duct 74. Typically, the top cowling member 64 tapers in girth toward its top surface, which is in the general proximity of the air intake opening 72.

The bottom cowling member 66 preferably has an opening at its bottom portion through which an upper portion of an intermediate member or exhaust guide member 78 extends. The intermediate member 78 preferably is made of aluminum based alloy and is affixed atop the driveshaft housing 54. The bottom cowling member 66 and the intermediate member 78 together generally form a tray. The engine 58 is placed onto this tray and is affixed to the intermediate member 78 with bolts. That is, the intermediate member 78 supports the engine 58. The intermediate member 78 also has an exhaust passage 79 through which burnt charges (e.g., exhaust gases) from the engine 58 are discharged. The steering handle 43 preferably is affixed to the intermediate member 78 in a proper manner.

As used in this description, the term "horizontally" means that the subject portions, members or components extend generally in parallel to the water line where the associated watercraft 40 is resting when the drive unit 34 is not tilted and is placed in the position shown in FIG. 1. The term "vertically" in turn means that portions, members or components extend generally normal to those that extend horizontally.

The engine 58 in the illustrated embodiment operates on a four-cycle combustion principle. The engine 58 has a cylinder block 80. The presently preferred cylinder block 80 defines four cylinder bores 82 which extend generally horizontally and are generally vertically spaced from one another. This type of engine, however, merely exemplifies one type of engine on which various aspects and features of the present invention can be suitably used. Engines having other number of cylinders, having other cylinder arrangements, and operating on other combustion principles (e.g., crankcase compression two-stroke or rotary) also can employ various features, aspects and advantages of the present invention.

A piston 84 reciprocates in each cylinder bore 82 in a well-known manner. A cylinder head assembly 86 is affixed to one end of the cylinder block 80 and closes the cylinder bores 82. The cylinder head assembly 86 preferably defines four combustion chambers 88 together with the associated pistons 84 and cylinder bores 82. Of course, the number of combustion chambers can vary, as indicated above. A crankcase member 90 closes the other end of the cylinder bores 82 and defines a crankcase chamber 92 together with the cylinder block 80.

A crankshaft or output shaft 94 extends generally vertically through the crankcase chamber 92 and is journaled for rotation by several bearing blocks in a suitable arrangement. Connecting rods 96 couple the crankshaft 94 in a well-known manner with the respective pistons 84. Thus, the crankshaft 94 can rotate with the reciprocal movement of the pistons 84.

Preferably, the crankcase member 90 is located at the most forward position, with the cylinder block 80 and the cylinder head member 86 extending rearward from the crankcase member 90, one after another. Generally, the cylinder block 80, the cylinder head member 86 and the crankcase member 90 together define an engine body 98. Preferably, at least these major engine portions 80, 86, 90 are made of aluminum based alloy.

Because the exhaust passage 79 is provided within the intermediate member 78, the connection between the intermediate member 78 and the engine body 98 preferably is sealed so as to prevent exhaust gas leaks or to reduce the level of exhaust gases leaking. A gasket thus is preferably interposed between a bottom surface of the engine body 98 and a top surface of the intermediate member 78.

The engine 58 comprises an air induction system. The air induction system draws air to the combustion chambers 88 from the cavity 62 of the protective cowling assembly 60. The air induction system preferably comprises intake ports, a number of intake passages and a plenum chamber. The intake ports can be defined in the cylinder head assembly 86. In one configuration, intake valves repeatedly open and close the respective intake ports. When each intake port is opened, the corresponding intake passage communicates with the associated combustion chamber 88. The respective intake passages preferably have throttle valves journaled therein for pivotal movement about an axis of a valve shaft that extends generally vertically. The throttle valves are operable by the operator through an appropriate throttle valve linkage. The throttle valves measure or regulate an amount of air flowing through the respective air intake passages. Normally, the greater the opening degree, the higher the rate of airflow and the higher the engine speed.

The engine 54 also comprises an exhaust system that routes burnt charges or exhaust gases to a location outside of the outboard motor 30. Each cylinder bore 82 preferably has exhaust ports defined in the cylinder head assembly 86. The exhaust ports are repeatedly opened and closed by exhaust valves.

An exhaust manifold is defined next to the cylinder bores 82 in the cylinder block 80 and preferably extends generally vertically. The exhaust manifold communicates with the exhaust ports to collect exhaust gases from the combustion chambers 88 through the respective exhaust ports. The exhaust manifold is coupled with the exhaust passage 79 of the intermediate member 78. When the exhaust ports are opened, the combustion chambers 88 communicate with this exhaust passage 79 through the exhaust manifold.

A valve cam mechanism is preferably provided for actuating the intake and exhaust valves. In the illustrated embodiment, the cylinder head assembly 86 journals at least one camshaft 104 that extends generally vertically. The camshafts 104 actuate the intake valves and exhaust valves. The camshafts 104 have cam lobes to push the intake and exhaust valves in a controlled timing configuration to open and close the intake and exhaust ports. Other conventional valve drive mechanisms can of course be employed instead of such a camshaft-based mechanism.

In the illustrated arrangement, the camshafts 104 have driven sprockets 106 positioned atop thereof and the crankshaft 94 has a drive sprocket 108 positioned almost atop thereof. A timing chain or belt 110 is wound around the drive and driven sprockets 108, 106. The crankshaft 94 thus drives the camshafts 104 through the timing chain 110 in timed relationship.

The engine 58 preferably has a port or manifold fuel injection system. The fuel injection system preferably comprises four fuel injectors with one fuel injector allotted for each of the respective combustion chambers 88. The fuel injectors spray fuel into the intake passages under control of an ECU (electronic control unit). Of course, in some arrangements, the fuel injectors can be disposed for direct cylinder injection and, in other arrangements, carburetors can replace or accompany the fuel injectors.

The engine 58 further comprises an ignition or firing system. Each combustion chamber 88 is provided with a spark plug connected to the ECU so that ignition timing is also controlled by the ECU. The spark plugs have electrodes that are exposed into the associated combustion chamber 88 and that ignite an air/fuel charge in the combustion chamber 88 at selected ignition timing.

In the illustrated engine 58, the pistons 84 reciprocate between top dead center and bottom dead center. When the crankshaft 94 makes two rotations, the pistons generally move from top dead center to bottom dead center (the intake stroke), from bottom dead center to top dead center (the compression stroke), from top dead center to bottom dead center (the power stroke) and from bottom dead center to top dead center (the exhaust stroke). During the four strokes of the pistons 84, the camshafts 104 make one rotation and actuate the intake and exhaust valves to open the intake ports during the intake stroke and to open exhaust ports during the exhaust stroke, respectively.

Generally, at the beginning of the intake stroke, air preferably is drawn through the air intake passages and fuel preferably is injected into the intake passage by the fuel injectors. The air and the fuel thus are mixed to form the air/fuel charge in the combustion chambers 88. Just before or during the power stroke, the respective spark plugs ignite the compressed air/fuel charge in the respective combustion chambers. The engine 58 thus continuously repeats the foregoing four strokes during its operation.

The engine 58 preferably includes a lubrication system. Although any types of lubrication systems can be applied, a closed-loop type system preferably is employed in the illustrated embodiment. The lubrication system comprises a lubricant tank 112 defining a reservoir cavity preferably positioned within the driveshaft housing 54. An oil pump 114 is provided at a desired location, such as a bottom of the camshaft 104, to pressurize the lubricant oil in the reservoir and to pass the lubricant oil through a suction pipe toward engine portions which needs lubrication through appropriate lubricant delivery passages. The engine portions that need lubrication include, for instance, the crankshaft bearings, the connecting rods 96 and the pistons 84. Lubricant return passages also are provided to return the oil to the lubricant tank 112 for re-circulation. Preferably, the lubrication system further comprises a filter assembly to remove foreign matter (e.g., metal shavings, dirt, dust and water) from the lubricant oil before the oil is recirculated or delivered to the various engine portions. The cylinder head assembly 86 has an lubricant supply inlet 114 that communicates with the lubricant tank 112, while the lubricant tank 112 has a drain 116 at a rear bottom thereof.

A flywheel assembly 120 preferably is positioned above atop the crankshaft 94 and is mounted for rotation with the crankshaft 94. The illustrated flywheel assembly 120 comprises a flywheel magneto or AC generator that supplies electric power to various electrical components such as the fuel injection system, the ignition system and the ECU.

The driveshaft housing 54 depends from the power head 50. More specifically, a top end of the driveshaft housing 54 is affixed to the bottom end of the intermediate member 78 with bolts in the illustrated arrangement. A gasket preferably is interposed between a bottom end of the intermediate member 78 and the top end of the driveshaft housing 54. Because the lubricant tank 112 also has a portion abutting on the intermediate member 78, the gasket preferably covers this abutting portion also.

The driveshaft housing 54 supports a driveshaft 124 which is driven by the crankshaft 94. The driveshaft 124 extends generally vertically through the driveshaft housing 54. A coupling of the driveshaft 124 with the crankshaft 94 will be described in greater detail shortly.

The driveshaft housing 54 also defines internal passages such as an exhaust pipe 126, which forms a portion of the exhaust system. The internal passages also include an idle discharge section. The idle discharge section includes an idle expansion chamber 128 and an idle discharge port 130. An apron 132 covers an upper portion of the driveshaft housing 54 and improves the overall appearance of the outboard motor 30.

The lower unit 56 depends from the driveshaft housing 54 and supports a propulsion shaft 136, which is driven by the driveshaft 124. The propulsion shaft 136 extends generally horizontally through the lower unit 56. A propulsion device is attached to the propulsion shaft 136 and is powered through the propulsion shaft 136. In the illustrated arrangement, the propulsion device is a propeller 138 that is affixed to an outer end of the propulsion shaft 138. The propulsion device, however, can take the form of a dual counter-rotating system, a hydrodynamic jet, or any of a number of other suitable propulsion devices.

A transmission 142 preferably is provided between the driveshaft 124 and the propulsion shaft 136. The transmission 142 couples together the two shafts 124, 136 which lie generally normal to each other (i.e., at a 90° shaft angle) with bevel gears. The outboard motor 30 has a switchover or clutch mechanism that allows the transmission 142 to change the rotational direction of the propeller 138 among forward, neutral or reverse.

The lower unit 56 also defines an internal passage of the exhaust system. An expansion chamber 146 occupies major volume of the passage and is formed above a space where the propulsion shaft 136 extends so that the exhaust pipe 126 communicates with the expansion chamber 146. At engine speeds above idle, the exhaust gases generally are discharged to the body of water surrounding the outboard motor 30 through the internal passage and finally through a discharge section defined within the hub of the propeller 138. The foregoing idle discharge section is provided for lower speed engine operation. The difference in the locations of the discharges accounts for the differences in pressure at locations above the waterline and below the waterline. Because the opening above the line is smaller, pressure develops within the lower unit 56. When the pressure exceeds the higher pressure found below the waterline, the exhaust gases exit through the hub of the propeller 138. If the pressure remains below the pressure found below the waterline, the exhaust gases exit through the idle discharge section including the discharge port 130 above the waterline.

During the engine operation, heat builds in the engine body 98 and in the exhaust system. The outboard motor 30 preferably employs an open-loop type water cooling system to cool the engine body 98 and the exhaust system. The engine body 98 has one or more water jackets through which water runs to remove the heat. The cooling system introduces water from the body of water through a water inlet 150 disposed at a side surface of the lower unit 56. A water pump 152 is disposed at a bottom end of the driveshaft housing 54 and around the driveshaft 124 so that the driveshaft 124 drives the water pump 152. The majority of the introduced water is supplied to the water jackets through a water supply passage 152 formed within the housing unit 52. The intermediate member 78 defines a water collection area 154 where the water is collected from the water supply passage 152. The water is then delivered to and cools the engine portions that have built heat.

The cooling system in the illustrated embodiment also includes an inner water pool 158 and an outer water pool 160. The inner water pool 158 directly surrounds the exhaust pipe 126 and is supplied with the water that has run through the water jackets in the engine body 98. The outer water pool 160 surrounds the inner water pool 158 and is supplied with water that is branched off from the water supply passage 152 before going to the water jackets. The water in the pools 158, 160 spills over to a water discharge passage 162 defined between an inner surface of the driveshaft housing 54 and an outer surface of the outer water pool 160 through a discharge pipe 164. The water, then, returns to the body of water through discharge slits 166 formed at a side of the lower unit 56.

With still reference to FIG. 1 and additionally reference to FIGS. 2 to 5, the shaft coupling 32 will now be described in great detail below.

The crankcase member 90 defines the crankcase chamber 92 together with the cylinder block 80 as noted above. The crankshaft 94 is journaled, at least in part, by bearing blocks 180 defined between the cylinder block 80 and the crankcase member 92 so as to have an axis 181 that extends generally vertically. As illustrated in FIG. 1, the bearing blocks 180 preferably include at least upper block portions 182a, 182b and lower block portions 184a, 184b. Roller bearings 186 are disposed at the bearing blocks 180 to support the crankshaft 94 for rotation. The lubrication system advantageously delivers the lubricant oil to the bearing blocks 180, which include the upper and lower block portions 182a, 182b, 184a, 184b, and to the roller bearings 186.

The bottom end of the crankshaft 94 extends through an aperture 188 defined by the lower block portions 184a, 184b and its bottom surface is almost leveled with a bottom surface of the cylinder block 80. The crankshaft 94 has a recessed portion 190 that is defined at the bottom end thereof and that extends coaxially with the crankshaft 94 itself. A configuration of the recessed portion 190 sectioned along a plane extending normal to the axis 181 preferably is a circle. The inner surface of the illustrated recessed portion 190 advantageously defines spline grooves 192. The recessed portion 190 in the illustrated arrangement is simply a blind hole formed in the end of the crankshaft. Preferably, the depth of the blind hole is substantially commensurate with a distance to the end of the crankshaft from the lowermost throw of the crankshaft.

The intermediate member 78 has an upper projection 194 and a lower projection 196 both extending forwardly and positioned generally underneath the bottom end of the crankshaft 94. A pair of ribs 195 couples the upper and lower projections 194, 196 to reinforce them. The upper projection 194 preferably includes spaces 198 (FIG. 3) for placing upper mount assemblies that couple the drive unit 34 with the steering shaft. Both of the upper and lower projections 194, 196 define apertures 200, 202, respectively. The apertures 200, 202 have axes that extend substantially coaxially and that are generally aligned with the axis 181 of the crankshaft 94.

The driveshaft 124 extends through the apertures 200, 202 and a tip portion 204 thereof is inserted into the recessed portion 190 of the crankshaft 94. The recessed portion 190 is deeply formed so that a grease pocket 205 is defined within the crankshaft beyond the tip portion 204 of the driveshaft. The tip portion 204 of the driveshaft 124 is formed with spline grooves 192 that complement splines of the recessed portion 190. The crankshaft 94 and the driveshaft 124, thus, can be engaged for rotation with each other through the spline grooves 192. Of course, in some applications, the drive shaft can have the recess while the crankshaft has the tip portion that extends into the recess. This construction, however, is less suitable due to the possibility that water can become trapped within the recess.

Figure 2:
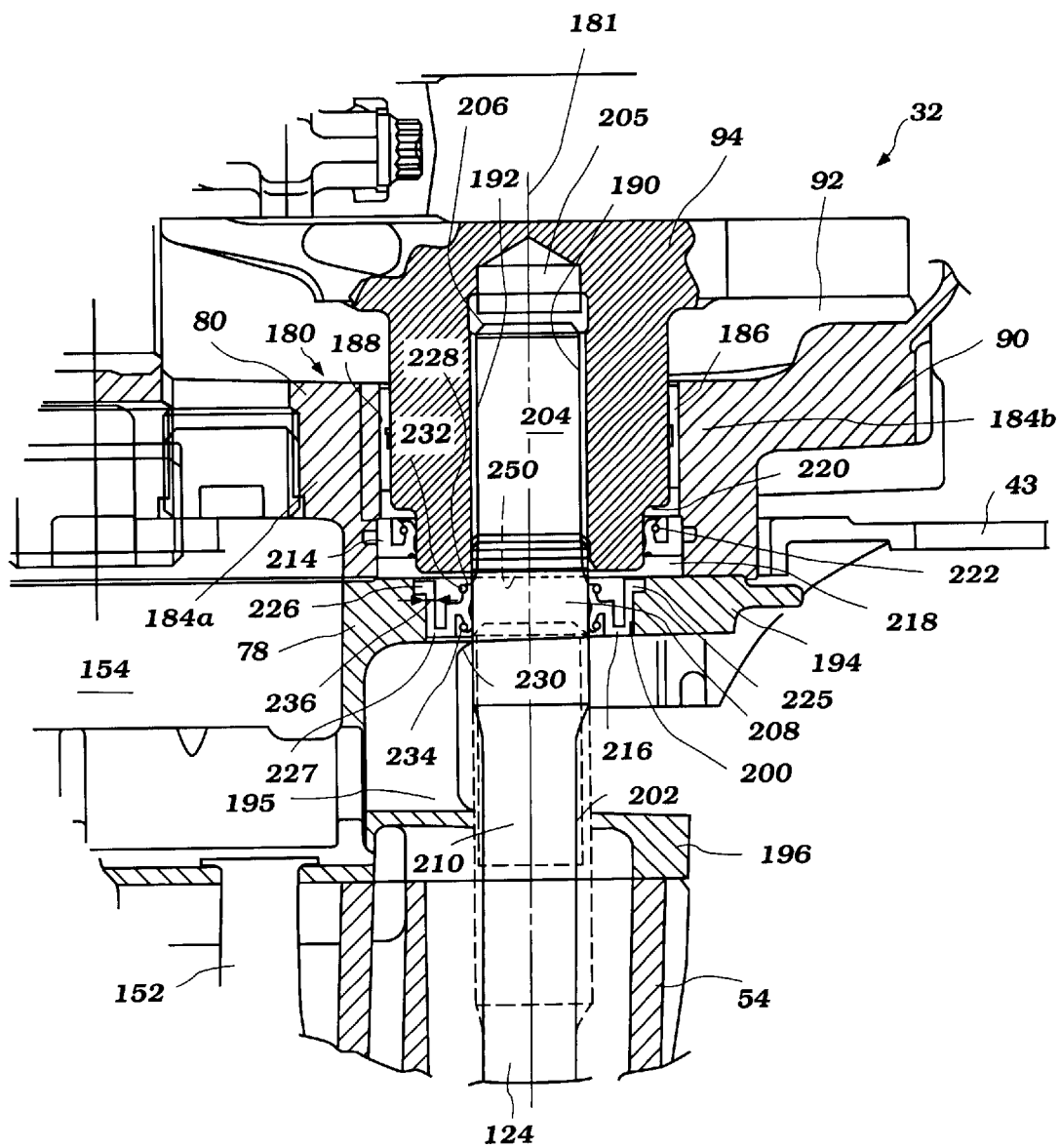
FIG. 2 is a partially sectioned view that enlarges a shaft coupling shown in FIG. 1.

With reference now to FIG. 2, an inner diameter of the aperture 200 preferably is formed larger than necessary for the tip portion 204 of the drive shaft to extend through. An inner diameter of the aperture 202 preferably is less than the inner diameter of the aperture 200 and more preferably is only slightly larger than an outer diameter of the tip portion 204. The aperture 202 thus advantageously guides the tip portion 204 when the tip portion 204 is inserted to the recessed portion 190 as shown in dotted line. The tip portion 204 preferably has a round or tapered end cut 206 for easy insertion.

An intermediate portion 208 of the driveshaft 124, which will be disposed proximate the aperture 200 when mounted, preferably has the same outer diameter as the outer diameter of the tip portion 204 (i.e., the intermediate portion 208 is larger a portion below it). A major portion 210 of the driveshaft 124, which is located below the intermediate portion 208, has an outer diameter smaller than those of the tip and intermediate portions 204, 208. In other words, the outer diameter of the major portion 210 of the driveshaft 124 is sufficiently less than the inner diameter of the aperture 202. Thus, the major portion 210 of the driveshaft 124 advantageously does not significantly contact the lower projection 196 even if bending occurs along the driveshaft during rotation.

Before accepting the tip portion 204, the recessed portion 190 preferably is filled with a proper amount of grease and/or the grease is smeared around the tip portion 204 for lubrication of the shaft coupling 32. In order to prevent the grease from leaking out, upper and lower seal members 214, 216 preferably are provided to form a grease chamber 218 around the tip and intermediate portions 204, 208 of the driveshaft 124. The grease chamber 218 includes the grease pocket 205.

The bottom end of the crankshaft 94 is configured to have a slightly smaller outer diameter when compared to the balance of the crankshaft 94. A ring-shaped step 220 thus is formed to accept the upper seal member 214. The upper seal member 214 is set between an inner surface of the aperture 188 of the cylinder block 80 and an outer surface of the step 220 of the crankshaft 94. While a base portion of the illustrated seal member 214 is press-fitted to the inner surface of the aperture 188, a lip or seal portion thereof abuts on the outer surface of the step 220. A clip portion 222 advantageously can be provided to retain the seal member 214 in position.

The lower seal member 216 in turn is set between an inner surface of the aperture 200 of the upper projection 194 of the intermediate member 78 and an outer surface of the intermediate portion 208 of the driveshaft 124. A ring-shaped step 225 is formed atop the aperture 200 and a flange 226 of a base portion 227 of the seal member 216 rests on the step 225 in the illustrated arrangement. The base portion 227 preferably is press-fitted to the inner surface of the aperture 200 so as to fixedly abut thereon. The base portion 227 then extends to the outer surface of the driveshaft 124. That is, the base portion 227 is configured as a single bellow (i.e., shaped as the letter U) in section as best seen in FIG. 2. The end of the base portion 227 is bifurcated to have a pair of lips or seal portions 228, 230 that abut on the outer surface of the intermediate portion 208 of the driveshaft 124. Clip portions 232, 234 advantageously can be provided to retain the seal member 216 in position. A distance between the inner surface of the aperture 216 and the outer surface of the intermediate portion 208 of the driveshaft 124 preferably is at least four times greater than a thickness 236 of the base portion 227.

In the illustrated arrangement, the lower seal member 216 preferably is mounted proximate the aperture 200 before the driveshaft 124 is inserted to the recessed portion 190 of the crankshaft 94. Because the tip portion 204 of the driveshaft 124 is guided by the aperture 202 and has the round or tapered cut 206 as noted above, the portion 204 can enter the lower seal member 216 and proceed therethrough smoothly without damaging the lip portions 228, 230.

The configuration of the lower seal member 216 is advantageous because the lip portions 228, 230 can stick closely to the intermediate portion 208 even though the driveshaft 124 slightly slips off the primary axis 181 during rotation. In addition, because the lip portions 228, 230 form a double seal arrangement along the axis 181 of the driveshaft 124, grease leakage can be greatly reduced or eliminated from the lip portions 228, 230. Furthermore, water can be greatly inhibited from entering as a result of the illustrated double seal arrangement.

The grease thus is well retained in the grease chamber 218, i.e., around the shaft coupling 32. Oil film is also formed by the grease between inner surfaces of the lip portions 228, 230 of the lower seal member 216 and the outer surface of the intermediate portion 208 of the driveshaft 124. The lip portions 228, 230 thus properly slide over the outer surface of the intermediate portion 208 even though the driveshaft 124 rotates in high speed and the sealing effect of the lower seal member 216 can be maintained in good condition. The same situation occurs between the lip portion of the upper seal member 214 and the crankshaft 94.

Figure 3:
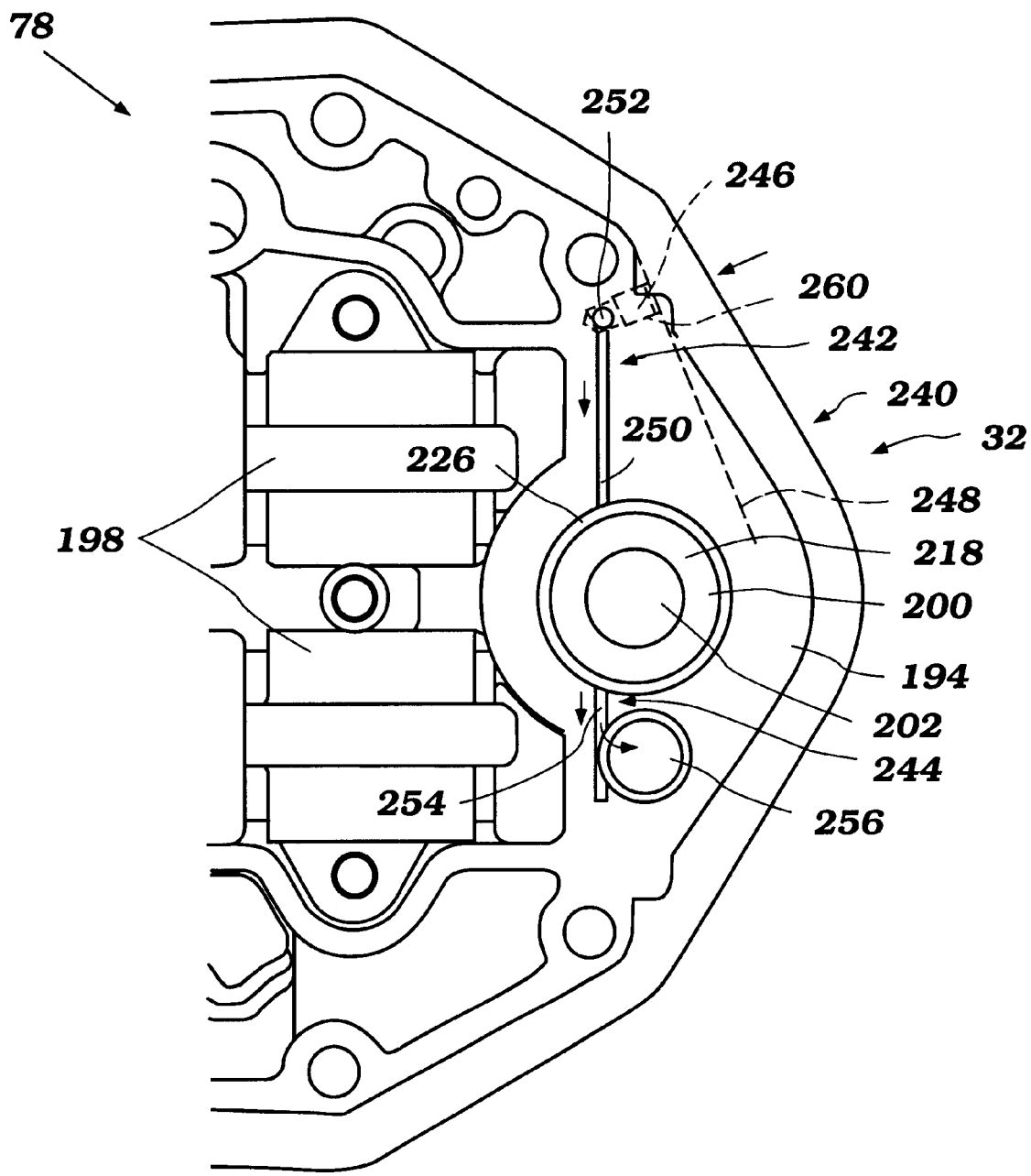
FIG. 3 is an enlarged partial top plan view of an intermediate member of the outboard motor.
Figure 4:
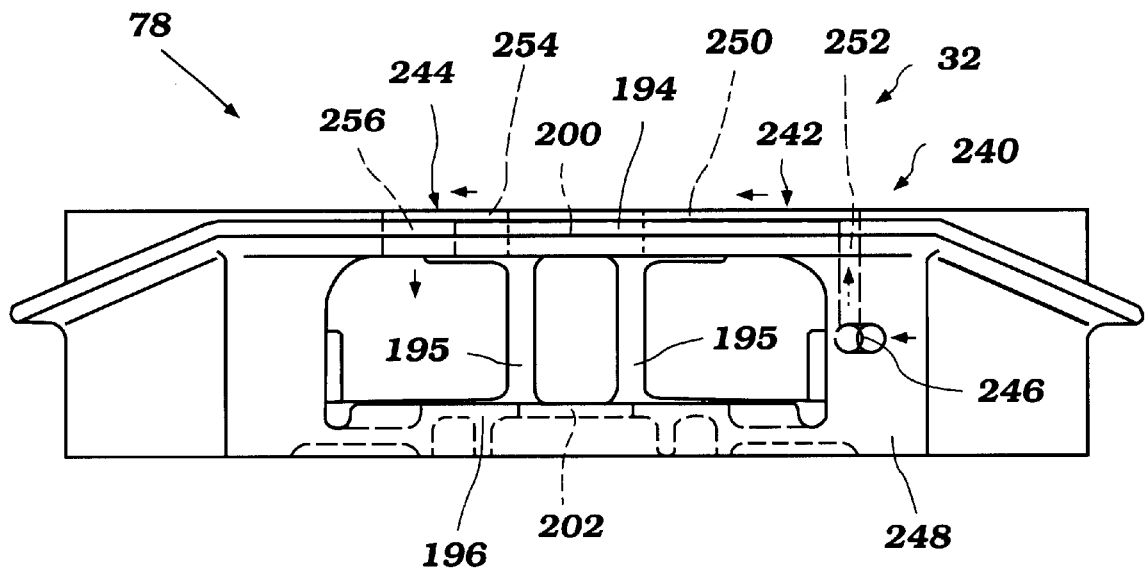
FIG. 4 is a front view of the intermediate member.
Figure 5:
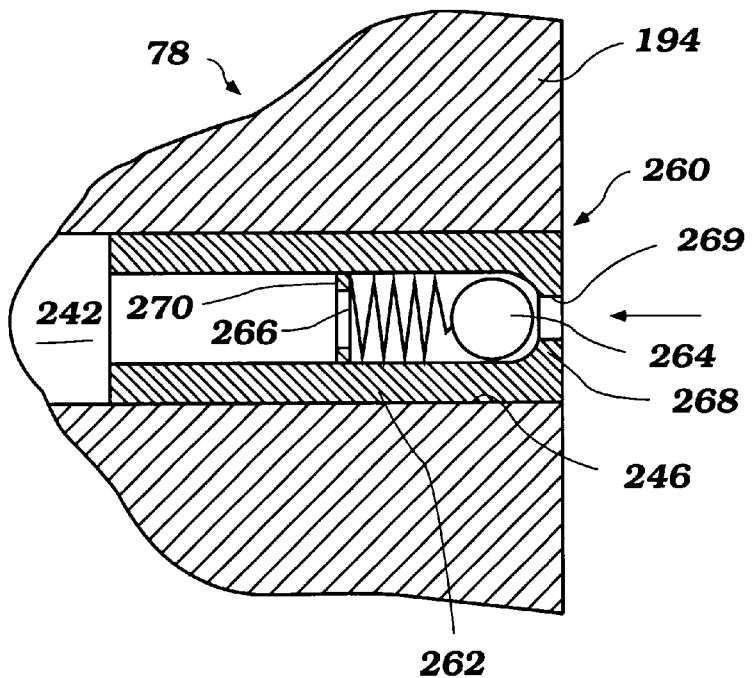
FIG. 5 is a sectioned view showing a grease injection port formed at the intermediate member.

Notwithstanding the above arrangement, a minute amount of grease may leak out from the grease chamber 218 over time. The arrangement thus is provided with a grease supply system 240, as shown in FIGS. 3–5. For clarity, the driveshaft 124 and the seal member 216 are omitted in FIGS. 3 and 4.

The grease supply system 240 is formed next to the upper mount assemblies in the upper projection 194 of the intermediate member 78. The grease supply system comprises a grease supply passage 242 and a grease drainage passage 244, both of which communicate with the grease chamber 218.

The supply passage 242 includes a grease injection port 246 formed at a forward end portion 248 of the upper projection 194 on the starboard side. The supply passage 242 also includes a horizontal ditch 250 that defines a pathway to the grease chamber 218 in combination with the bottom surface of the cylinder block 80. The supply passage 242 preferably is completed with a vertical aperture 252 that communicates with the injection port 246 and with the horizontal ditch 250.

The drainage passage 244 in turn includes a horizontal ditch 254 that defines a pathway from the grease chamber 218 in combination with the bottom surface of the cylinder block 80. A drain port 256 is formed at the upper projection 194 on the port side to complete the drainage passage 244. The drain port 256 is a through-hole that preferably opens to a space defined slightly forwardly of the ribs 195. In the illustrated embodiment, the drain port 256 has an inner diameter greater than an inner diameter of the injection port 246.

The grease supply passage 242 preferably has a check valve unit 260 at the injection port 246. As seen in FIG. 5, the illustrated check valve unit 242 comprises a tubular valve body 262, a ball 264 and a biasing member 266. The biasing member in the illustrated arrangement is a coil spring. The valve body 262 includes an inlet portion 268 that forms an opening 269 and a retainer portion 270 that is positioned internally. The opening 269 has a reduced inner diameter relative to the balance of the unit 260. The ball 264 and the spring 266 are positioned between the inlet portion 268 and the retainer portion 270 so that the ball 264 faces the inlet portion 268 while the spring 266 is seated on the retainer portion 270. Normally, the spring 266 urges the ball 264 toward the inlet portion 268 to close the opening 269. Although not shown, the grease drainage passage 244 preferably has another check valve unit at the drain port 256. This check valve can have a construction similar to the valve unit 260 except that the ball and the spring are positioned differently with each other so that the spring is located outwardly than the ball. The urging force of both of the springs is adjusted to keep the balls in the closed positions under a static pressure but to allow the balls to move from the closed positions when a dynamic pressure that is greater than a preset magnitude is exerted.

The user (or operator, mechanic or repair person) regularly or under a necessary condition can refill grease into the grease chamber 218 through the supply system 240. The user can use a grease filler or grease gun that is usually sold on the market. Grease is injected into the port 246. Under this condition, because a dynamic pressure greater than the preset magnitude is given, the check valve unit 260 allows the grease to enter the port 246. The grease then goes to the grease chamber 218 through the port 246, the aperture 252 and the ditch (pathway) 250 and fills the chamber 218. Excess grease further goes to the drain port 256 through the ditch (pathway) 254. The dynamic pressure still exerts upon the check valve unit at the drain port 256 so that the valve unit allows the excess grease to spill over from the drain port 256. The user thus recognizes that sufficient grease has been supplied and hence ceases the injection of the grease.

Under any normal conditions other than that described above, no dynamic pressure is given to either the check valve unit 260 at the injection port 246 or the other check valve at the drain port 256, the grease will not leak out beyond both the valve units. For instance, splash water, water mist or other foreign substances cannot exert such a dynamic pressure. As a result, the illustrated arrangement inhibits not only any leakage of the grease but also any invasion of water or foreign substances from occurring.

As best seen in FIG. 2, in the illustrated embodiment, the water collection area 154 where relatively cold water is collected is disposed next to the upper projection 194 and the bottom end of the cylinder block 80. The water collection area 154 is advantageous because the upper projection 194 and the bottom end of the cylinder block 80 is cooled by the cold water and the grease in the grease chamber 218 hence can keep proper viscosity. Leakage possibility of the grease at the seal members 214, 216 is further decreased accordingly. It should be noted, however, that the water collection area 154 is not necessarily disposed in proximity to the grease chamber 218.

The intermediate member is tightly affixed to the engine body with the gasket as noted above. However, air-tight connection is not necessary. Water-tight connection is good enough for preventing the grease from leaking out and for inhibiting water from entering the grease chamber.

The horizontal ditches can be formed at the bottom of the engine body or at both of the intermediate member and the engine body. Apertures formed through the intermediate member can replace the ditches.

The check valve unit is not necessarily a combination of a ball and a bias spring. For example, a conventional reed type valve can replace the ball and spring combination. In particular, the reed type valve is useful if an inner diameter of the grease passage is large. The reed type valve thus is particularly suitable for the drain port as such having a relatively large inner diameter. Whether the reed valve is provided at either one of the injection or drain port or both of the injection and drain ports, each reed should be disposed to allow grease to enter and to drain excess grease but to prevent water or foreign substances from entering.

The engine body with the crankshaft can be mounted on the intermediate member either before or after the driveshaft is fixed in position. If the engine body is placed before the driveshaft is fixed, the tip portion of the driveshaft is inserted into the recessed portion of the crankshaft. If, in the meantime, the engine body is placed after the driveshaft is fixed, the recessed portion is inserted onto the tip portion. Regardless, the lower seal member preferably is first press-fitted at the aperture of the upper projection.

Figure 6:
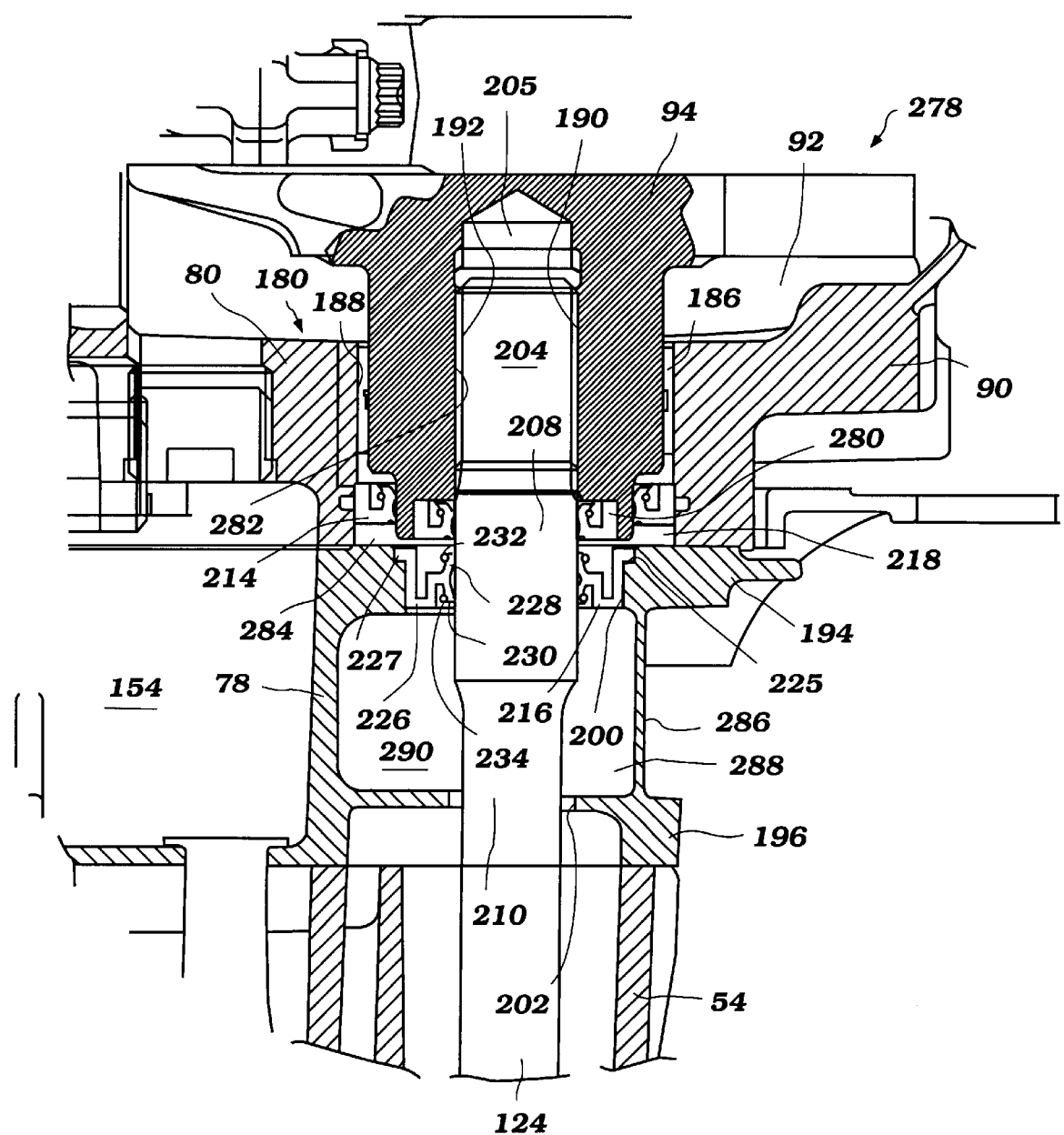
FIG. 6 is a partially sectioned view of another shaft coupling in accordance with a second embodiment of the present invention.

With reference to FIG. 6, another shaft coupling 278 as a second embodiment of the present invention will be described below. The arrangement and construction of the coupling 278 is generally the same as the coupling 32 except for the particular arrangement and construction that will now be described and is shown in FIG. 6. The same members and components already described thus are assigned with the same reference numerals and will not be repeatedly described.

A third or intermediate seal member 280 is disposed between the outer surface of the intermediate portion 208 of the driveshaft 124 and the inner surface of the recessed portion 190 of the crankshaft 94 in this arrangement. The intermediate seal member 280 divides the lubricant chamber 218 into an upper space 282 defined in the recessed portion 190 and including the grease pocket 205 and a lower space 284 defined out of the recessed portion 190. A front wall 286 and a pair of side walls 288 surround a portion of the driveshaft 124 existing between the upper and lower projections 194, 196. A hollow 290 thus is formed around the portion of the driveshaft 124. No grease supply system is provided in the shaft coupling 278, although it is of course applicable.

The upper space 282, particularly the grease pocket 205, and even the lower space 284 are filled with grease before assembling the shaft coupling 278. Because the upper space 282 is sealed with the intermediate seal member 280 and then is double sealed with the upper and lower seal members 214, 216, the grease in the space 282 is restrained from substantial leakage. The double lip construction of the lower seal member 216 still is effective to trap the grease.

Since the lower space 284 also is first filled with the grease, the lip portions 228, 230 of the lower seal member 216 and the lip portion of the upper seal member 214 can maintain an oil film. The lip portions 228, 230 thus properly slide over the outer surface of the intermediate portion 208 even though the driveshaft 124 rotates in high speed and the sealing effect of the lower seal member 216 and the upper seal member 214 can be maintained in good condition.

It should be noted, however, the lower space 284 is not necessarily filled with the grease during assembly because the oil films will be dispersed within the chamber even if an extremely small amount of grease or lubricant exists around the seal members 214, 216. While the lubricant for the bearing block 180 is good enough for forming the oil film for the upper seal member 214, the exceedingly small amount of the grease coming from the upper space 282 is also sufficient enough to form the oil film for the lower seal member 216. However, the lower space 284 preferably is filled with the grease to further inhibit water infiltration into the lower space 284 and the upper space 282. Any corrosion by the water thus can be effectively prevented.

Because the front wall 286 and the side walls 288 surround the portion of the driveshaft 124 between the upper and lower projections 194, 196, invasion of the water to the grease chamber 218 also is quite sufficiently inhibited in this arrangement.

Of course, the foregoing description is that of preferred constructions having certain features, aspects and advantages in accordance with the present invention. Various changes and modifications may be made to the above-described arrangements without departing from the spirit and scope of the invention, as defined by the appended claims.

What is claimed is:

1. An outboard motor comprising an internal combustion engine, the engine including an engine body and an output shaft, the engine body defining a first aperture through which the output shaft extends, the output shaft having a recessed portion, the recessed portion defining inner splines, a support member supporting the engine body, the support member defining a second aperture, a driveshaft extending through the second aperture toward the recessed portion, the driveshaft having a tip portion defining outer splines, the outer splines being coupled with the inner splines so that the driveshaft is rotatably connected to the output shaft, a first seal member disposed between an outer surface of the output shaft and an inner surface of the first aperture, and a second seal member disposed between an outer surface of the driveshaft and an inner surface the second aperture, the engine body, the support member, the output shaft, the driveshaft and the first and second seal members together defining a lubricant chamber to enclose lubricant, at least one of the support member and the engine body forming a lubricant supply passage communicating with the lubricant chamber, and the supply passage having a lubricant injection port through which the lubricant is injected into the supply passage.

2. The outboard motor as set forth in claim 1, wherein at least a portion of the supply passage is formed between the support member and the engine body.

3. The outboard motor as set forth in claim 2, wherein at least one of the support member and the engine body has a ditch that forms the supply passage portion.

4. The outboard motor as set forth in claim 1, wherein the injection port includes a check valve arranged to allow the lubricant being injected into the supply passage and to inhibit the lubricant from leaking out.

5. The outboard motor as set forth in claim 1, wherein at least one of the support member and the engine body forming a lubricant drainage passage communicating with the lubricant chamber, and the drainage passage having a lubricant drain port through which the lubricant is drained out.

6. The outboard motor as set forth in claim 1, wherein the second seal member has a base portion and a pair of seal portions bifurcated from the base portion, and the seal portions abut on the outer surface of the driveshaft.

7. The outboard motor as set forth in claim 6, wherein the second aperture has an inner diameter greater than an outer diameter of the driveshaft, and a distance between the inner surface of the second aperture and the outer surface of the driveshaft is at least four times greater than a thickness of the base portion of the seal member.

8. The outboard motor as set forth in claim 7, wherein the base portion has at least one bellow configuration.

9. The outboard motor as set forth in claim 7, wherein the base portion includes a section abutting on an inner surface of the support member so that the bellow configuration is interposed between the section of the base portion and the seal portions.

10. The outboard motor as set forth in claim 6, wherein the base portion has at least one bellow configuration.

11. The outboard motor as set forth in claim 1, wherein the second aperture has an inner diameter greater than an outer diameter of the driveshaft, and a distance between the inner surface of the second aperture and the outer surface of the driveshaft is at least four times greater than a thickness of the second seal member.

12. The outboard motor as set forth in claim 1, wherein both the output shaft and the driveshaft extend generally vertically.

13. The outboard motor as set forth in claim 1 additionally comprising an exhaust system arranged to discharge exhaust gases from the engine, wherein the support member defines a portion of the exhaust system.

14. The outboard motor as set forth in claim 1 additionally comprising a cooling system arranged to cool at least a portion of the engine body, wherein a portion of the cooling system is disposed adjacent to the lubricant chamber.

15. The outboard motor as set forth in claim 14, wherein the support member defines the portion of the cooling system.

16. The outboard motor as set forth in claim 1, wherein the lubricant is grease.

17. An outboard motor comprising an internal combustion engine, the engine including an engine body and an output shaft, the engine body defining a first aperture through which the output shaft extends, the output shaft having a recessed portion, the recessed portion defining inner splines, a support member supporting the engine body, the support member defining a second aperture, a driveshaft extending through the second aperture toward the recessed portion, the driveshaft having a tip portion defining outer splines, the outer splines being coupled with the inner splines so that the driveshaft is rotatably connected to the output shaft, a first seal member disposed between an outer surface of the output shaft and an inner surface of the first aperture, a second seal member disposed between an outer surface of the driveshaft and an inner surface the second aperture, the engine body, the support member, the output shaft, the driveshaft and the first and second seal members together defining a lubricant chamber to enclose lubricant, and a third seal member disposed between an outer surface of the driveshaft and an inner surface of the recessed portion, the third seal member dividing the lubricant chamber into a first space defined in the recessed portion and a second space defined at least in part out of the recessed portion.

18. The outboard motor as set forth in claim 17, wherein the second seal member has a base portion and a pair of seal portions bifurcated from the base portion, and the seal portions abut on the outer surface of the driveshaft.

19. An outboard motor comprising an internal combustion engine, the engine including an engine body and an output shaft, the engine body defining a first aperture through which the output shaft extends and is journaled, the output shaft having a recessed portion, the recessed portion defining inner spline grooves, an exhaust system arranged to discharge exhaust gases from the engine, an exhaust guide member defining a portion of the exhaust system and supporting the engine body, the exhaust guide member defining a second aperture, a driveshaft extending through the second aperture toward the recessed portion, the driveshaft having a tip portion defining outer spline grooves, the outer spline grooves being coupled with the inner spline grooves so that the driveshaft is connected to the output shaft for rotation together with the output shaft, means for trapping lubricant at least in a space between the inner and outer spline grooves, and means for supply lubricant to the space between the wire and outer spline grooves, the means for supply lubricant having a lubricant supply port that is accessible while the engine body is supported by the exhaust guide.

20. The outboard motor as set forth in claim 19 additionally comprising a cooling system arranged to cool at least a portion of the engine body, wherein the exhaust guide member defines a portion of the cooling system positioned adjacent to the means for trapping lubricant.

21. A shaft coupling for an internal combustion engine comprising an engine body, an output shaft extending through an aperture defined in the engine body, a driven shaft driven by the output shaft, a coupling member adapted to couple the engine body to a housing of the driven shaft, the coupling member being fluid-tightly affixed to the engine body, the driven shaft extending through a through-hole defined in the coupling member to be coupled with the output shaft, a first seal arranged to seal between the engine body and the output shaft, and a second seal arranged to seal between the coupling member and the driven shaft, the second seal having a base portion and a pair of seal portions bifurcated from the base portion, the seal portions abutting on the outer surface of the driven shaft, and the engine body, the output shaft, the coupling member, the driven shaft and the first and second seals together defining a lubricant chamber, at least one of the engine body and the coupling member defining a lubricant supply passage opening externally and communicating with the lubricant chamber.

22. A shaft coupling for an internal combustion engine comprising an engine body, an output shaft extending through an aperture defined in the engine body, a driven shaft driven by the output shaft, a coupling member adapted to couple the engine body to a housing of the driven shaft, the coupling member being fluid-tightly affixed to the engine body, the driven shaft extending through a through-hole defined in the coupling member to be coupled with the output shaft, a first seal arranged to seal between the engine body and the output shaft, a second seal arranged to seal between the coupling member and the driven shaft, the second seal having a base portion and a pair of seal portions bifurcated from the base portion, the seal portions abutting on the outer surface of the driven shaft, and the engine body, the output shaft, the coupling member, the driven shaft and the first and second seals together defining a lubricant chamber, and a third seal arranged to seal between the output shaft and the driven shaft and to divide the lubricant chamber into at least two chamber sections.

23. An outboard motor comprising an internal combustion engine, the engine including an engine body and an output shaft, the engine body defining a first aperture through which the output shaft extends, the output shaft having a recessed portion, the recessed portion defining inner splines, a support member that supports the engine body and that defines a second aperture, a driveshaft extending through the second aperture toward the recessed portion, the driveshaft having a tip portion defining outer splines, the outer splines being coupled with the inner splines so that the driveshaft is rotatably connected to the output shaft, a first seal member disposed between an outer surface of the output shaft and an inner surface of the first aperture, and a second seal member disposed between an outer surface of the driveshaft and an inner surface the second aperture, the engine body, the support member, the output shaft, the driveshaft and the first and second seal members together defining a lubricant chamber to enclose lubricant, at least one of the support member and the engine body forming a lubricant supply passage communicating with the lubricant chamber, and the supply passage having a lubricant supply port accessible when the support member supports the engine.

\* \* \* \* \*